United States Patent [19]
D'Amico

[11] Patent Number: 4,759,492
[45] Date of Patent: Jul. 26, 1988

[54] PIPE ALIGNER

[76] Inventor: Daniel J. D'Amico, 3925 Rt. 96 South, Waterloo, N.Y. 13165

[21] Appl. No.: 70,453

[22] Filed: Jul. 6, 1987

[51] Int. Cl.[4] .............................................. B23K 37/04
[52] U.S. Cl. .................... 228/49.3; 269/131; 285/21
[58] Field of Search ................... 285/21, 22; 228/49.3; 29/272; 269/131, 43

[56] References Cited

U.S. PATENT DOCUMENTS

| | | | |
|---|---|---|---|
| 1,038,012 | 9/1912 | Sobey | 285/259 X |
| 1,382,840 | 6/1921 | Levedahl | 285/259 X |
| 1,848,527 | 3/1932 | Hickey | 269/131 |
| 1,894,835 | 1/1933 | Smith et al. | 269/131 X |
| 3,422,519 | 1/1969 | Fehlman | 228/49.3 |
| 3,566,507 | 3/1971 | Jacobsen | 228/49.3 X |
| 3,711,920 | 1/1973 | Simmons | 269/43 X |
| 3,933,292 | 1/1976 | Martin | 228/49.3 |
| 3,952,936 | 4/1976 | Dearman | 228/49.3 |
| 4,623,085 | 11/1986 | Dearman | 228/49.3 |

*Primary Examiner*—Thomas F. Callaghan
*Attorney, Agent, or Firm*—Robert M. Hallenbeck

[57] ABSTRACT

A pipe aligner for holding a metal pipe securely for welding which comprises a back, two arms that wrap around the pipe and means to secure the pipes to the arms and back.

7 Claims, 1 Drawing Sheet

PIPE ALIGNER

This invention relates to a pipe aligner for holding pipes together during welding, and more particularly, to a generally U-shaped device comprising a horizontal support member, two wrap around arms and securing means to hold the pipes tight against the arms and support member.

The welding of pipe ends to each other is required in a number of instances. In order to have a good weld, it is important to have the two sections of pipe properly aligned. In addition, it is important to make sure that the pipes are securely held so that during welding the alignment of the pipes is not displaced.

A number of devices have been proposed to satisfy these requirements. In U.S. Pat. Nos. 1,848,527 and 1,928,892 (issued to Hickey), a "Jewell clamp" was proposed. This clamp consists of an angular or V-shaped support on or against which the pipes rest. To secure the pipes to the support, Hickey proposed a chain. One end of the chain being fixed to one side of the support and the other end terminating in a screwlike device which is attached to a handle that can be turned to tighten the chain. The clamp proposed by Hickey remains in use today.

Other clamps have been proposed as well. In U.S. Pat. No. 453,745 (issued to Nettleton), Nettleton proposed a pair of free standing Y-shaped supports each having a separate strap by which to secure the pipe to the support. In U.S. Pat. No. 2,854,941 (issued to Vollmer), Vollmer proposed a platform supported by legs. On the platform, beveled wheels or rollers are mounted in opposition to each other to form a cradle for the pipes. A cable, one end of which is attached to a spring, and the other end of which is attached to a hook, is used to secure the pipes to the platform. Finally, in U.S. Pat. No. 3,894,326 (issued to Merriman), Merriman proposed a pair of semicylindrical sections which, when mated completely, surround the pipes to be welded.

In all of these instances, several drawbacks arise. First, each of the devices requires a significant amount of space on all sides of the pipes in order for the device to be positioned and to operate. In many instances, however, such room is not available. Often, pipe sections to be welded abut ceilings or walls, and thus, restrict placement of or securing of the device.

Second, the size of the devices makes it such that the device must be handled by two persons in order to insure proper alignment. In practice, two persons may be a luxury the operator cannot physically or economically afford.

Third, the size of the device slows down the speed at which the operator can work even if there are no space limitations.

The present invention solves each of these problems in a cost and space effective way. Briefly described, the device comprises a generally U-shaped support, further comprising a horizontal back member from which two arms extend in opposite directions and wrap around the lower half of the pipes to be welded in a spiral fashion and comprising a means to hold the pipes tightly against the arms and back.

It is an object of this invention to provide a space efficient device for the welding of sections of pipe.

An advantage of this invention is that it can be easily manipulated by one person.

A further advantage of this invention is its ease of operation.

Other objects and advantages of this invention will become apparent from the following detailed description of the invention which makes reference to the following figures, in which.

Figure 1:
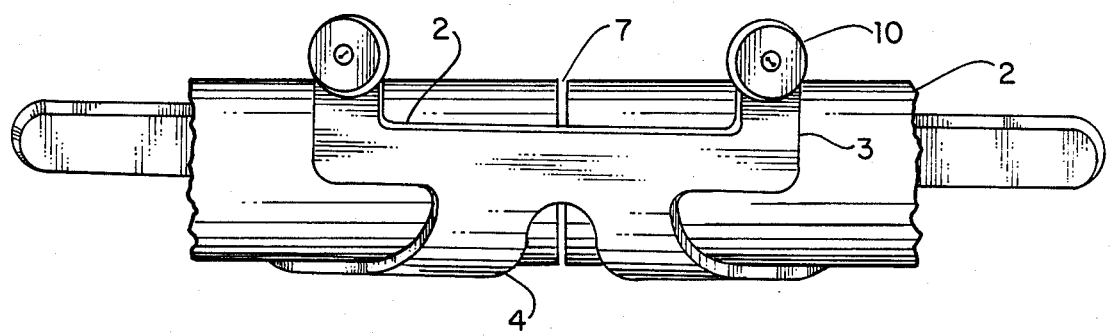
FIG. 1 is a front view of the device.

Referring to FIG. 1, the device is generally U-shaped. It comprises a single piece of a strong structural material such as steel. Forming one side of the U is a horizontal back member 2. The back runs along the same axis as the pipes 1 to be welded. At each end, the back terminates in a short vertical member 3 that extends slightly above the diameter of pipes to be welded. Alternately, the horizontal back member 2 and vertical member 3 may form a continuous rectangular unit.

Figure 2:
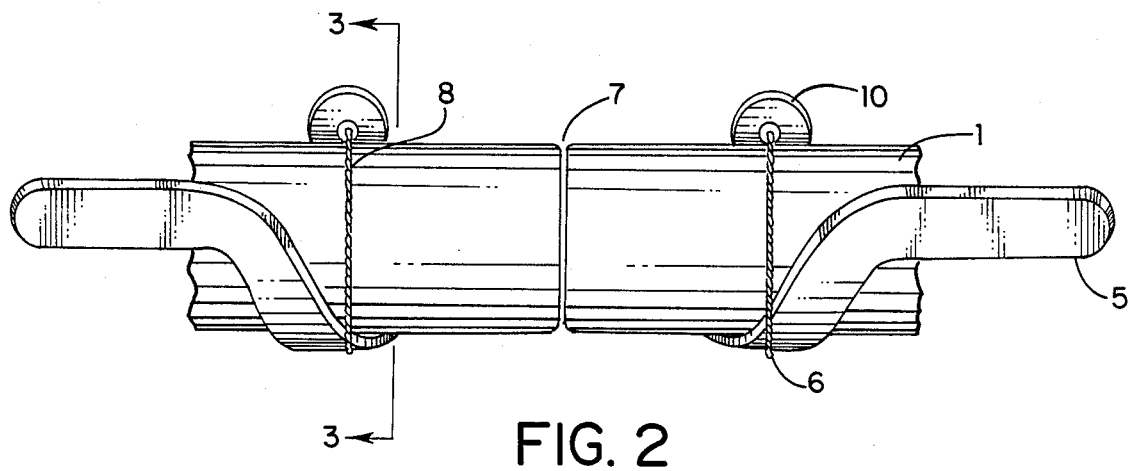
FIG. 2 is a back view of the device.

From the central portion of the back 2, extending in a spiral fashion run two arms 4. Each arm runs in an opposite direction. Each arm spirals under the pipe section it supports, and when the spiral reaches approximately half-way up the opposite side of the pipe, it then extends horizontally along the axis of said pipe 5. See FIG. 2.

The degree of spiral and total length of the device from the end of one arm to the other will depend upon the diameter of the pipes to be welded. For 2½ inch pipe, a total length of approximately 12 inches is appropriate. The length of the horizontal portion of each arm is approximately 4 inches, and the width of the device as measured between the horizontal back member and horizontal portion of the arm is 3 inches. For pipes of larger or smaller diameters, the length and width of the device can be increased or decreased proportionally such that it is of a length sufficient to support the pipes and is of a width sufficient to allow the securing means to tightly hold the pipe against the device.

Figure 3:
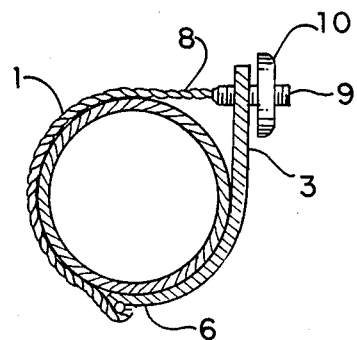
FIG. 3 is an end view of the device taken along the lines 3—3.

Referring to FIG. 3, through each vertical member 3 there is attached one end of a means to secure the pipes to the device. In the preferred embodiment, the securing means is a cable 8 that terminates in a threaded member 9 which extends through the vertical member 3. The vertical member 3 may be slotted to accept the threaded member. A nut 10 or similar locking means may be secured to the threaded member to tighten the cable about the pipes.

The other end of each cable is attached to the lower most portion of the respective arm 6. The attachment may be by any means known to those skilled in the art but should be of sufficient strength to withstand tension sufficient to hold the pipes to the device. In the preferred embodiment, the cable runs through the arm and ends in a knot or similar protuberance.

In order to weld two pipes together, each pipe 1 is layed in the device. The pipes are arranged so that the joint to be welded is placed in the approximate center of the device 7. The cables 8 then are wrapped around the pipes, inserted into the vertical members 3 and the nuts 10 tightened until the pipes are secured to the arms 4 and back 2.

Variations in the invention will undoubtedly suggest themselves to those skilled in the art. Accordingly, the above-description shall not be taken in any limiting sense.

I claim:

1. A pipe alignment device for aligning pipes to be welded together which comprises a generally U-shaped single support further comprising a horizontal support member which forms one side of the U and runs in the same axis as the pipes to be welded, a pair of arms integral therewith that extend from said horizontal support member in opposite directions and spiral under and more than half-way around said pipes and securing means, each means having two ends wherein one end is fixed to said horizontal member and the other end is fixed to said arms to hold said pipes tight against said support member and arms.

2. The device according to claim 1 wherein said horizontal member has two ends each of which extend vertically to a point above said pipes.

3. The device according to claim 2 wherein one end of said securing means is fixed to said vertical end of such horizontal member.

4. The device according to claim 3 wherein one end of such securing means terminates in a threaded member that extends through said vertical end of said horizontal member and is affixed thereto by a tightening means.

5. The device according to claim 1 wherein the device is made of steel.

6. The device according to claim 1 wherein the length of the device from the end of one arm to the end of the other is 12 inches.

7. The device according to claim 1 wherein the width of the device is 3 inches.

* * * * *